United States Patent
Golitschek Edler Von Elbwart et al.

(10) Patent No.: US 8,208,446 B2
(45) Date of Patent: Jun. 26, 2012

(54) METHOD FOR PERFORMING A SCHEDULING ALGORITHM WITH A MINIMUM RESOURCE PARAMETER AND METHOD OF CALCULATING SAME

(75) Inventors: Alexander Golitschek Edler Von Elbwart, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 954 days.

(21) Appl. No.: 10/594,556

(22) PCT Filed: Mar. 31, 2004

(86) PCT No.: PCT/EP2004/003431
§ 371 (c)(1),
(2), (4) Date: Sep. 24, 2007

(87) PCT Pub. No.: WO2005/096558
PCT Pub. Date: Oct. 13, 2005

(65) Prior Publication Data
US 2008/0117881 A1    May 22, 2008

(51) Int. Cl.
*H04B 7/216* (2006.01)

(52) U.S. Cl. ........ 370/335; 455/405; 455/418; 455/434; 455/450; 455/452.1; 455/452.2; 455/453; 370/310.2; 370/319; 370/320; 370/321; 370/322; 370/329; 370/344; 370/395.21; 370/395.43

(58) Field of Classification Search .......... 455/405, 455/418, 434, 450–453; 370/310.2, 319–322, 370/329, 341, 395.21–395.43, 335
See application file for complete search history.

(56) References Cited

U.S. PATENT DOCUMENTS

| | | | | |
|---|---|---|---|---|
| 6,018,642 A * | 1/2000 | Adachi | .................. | 340/7.33 |
| 6,212,196 B1 * | 4/2001 | Momona | .................. | 370/449 |
| 6,504,821 B2 * | 1/2003 | Berger | .................. | 370/236.1 |
| 6,678,252 B1 * | 1/2004 | Cansever | .................. | 370/253 |
| 6,731,947 B2 * | 5/2004 | Hoagland et al. | .......... | 455/517 |

(Continued)

FOREIGN PATENT DOCUMENTS
WO       02/27969        4/2002
(Continued)

OTHER PUBLICATIONS
PCT International Search Report dated Oct. 27, 2004.
(Continued)

*Primary Examiner* — Steve D Agosta
(74) *Attorney, Agent, or Firm* — Dickinson Wright PLLC

(57) ABSTRACT

The invention concerns a method for performing a scheduling algorithm in a scheduler (120) of a wireless communication system, comprising the steps of obtaining from a communication unit (200) a minimum resource parameter, wherein said minimum resource parameter indicates a minimum of resources allocated to the communication unit in a scheduling frame to meet a resource constraint and scheduling allocation units for radio access to the communication unit in a scheduling frame in accordance with the minimum resource parameter. The invention also concerns a method performed in a communication unit of a wireless communication network for generating a minimum resource parameter used in a scheduling algorithm to schedule allocation units in a scheduling frame for radio access to the communication unit (200) in accordance with the minimum resource parameter, comprising the steps of calculating the minimum resource parameter based on a determination of the power expended for processing of the scheduling frame, and signaling the calculated minimum resource parameter to the scheduler.

10 Claims, 4 Drawing Sheets

U.S. PATENT DOCUMENTS

| | | | | |
|---|---|---|---|---|
| 6,745,044 B1* | 6/2004 | Holtzman et al. | | 455/522 |
| 6,978,144 B1* | 12/2005 | Choksi | | 455/452.2 |
| 7,085,595 B2* | 8/2006 | Kitchin | | 455/574 |
| 7,450,975 B2* | 11/2008 | Harris | | 455/574 |
| 2004/0053574 A1* | 3/2004 | Klein | | 455/63.1 |
| 2007/0004374 A1* | 1/2007 | Kneckt | | 455/343.1 |

FOREIGN PATENT DOCUMENTS

| | | |
|---|---|---|
| WO | 03094565 | 11/2003 |

OTHER PUBLICATIONS

Paul J.M. Havinga, et al.; "Energy-efficient TDMA Medium Access Control protocol scheduling," XP-01183867, poceedings of the asian international mobile computing conference—AMOC 2000, Nov. 2000, pp. 1-9.

Japanese Office Action dated Aug. 11, 2009 with English translation thereof.

* cited by examiner

METHOD FOR PERFORMING A SCHEDULING ALGORITHM WITH A MINIMUM RESOURCE PARAMETER AND METHOD OF CALCULATING SAME

FIELD OF THE INVENTION

This invention relates to communication systems. It is particularly applicable to wireless communication systems where a scheduling algorithm assigns channel resources to users for transmission and reception of data. More specifically, the present invention relates to a method for performing a scheduling algorithm and a method of calculating a minimum resource parameter for use in a scheduling algorithm.

In a cellular mobile communication system, the mobile station usually transmits and receives information to and from a base station using channel resources such as time slots, frequency bandwidth, code sequence, or combinations thereof. These resources are generally shared among users of the communication system.

BACKGROUND OF THE RELATED ART

In an ad-hoc mobile communication system, a radio access point usually transmits and receives information to and from other radio access points within the same ad-hoc network, using channel resources such as time slots, frequency bandwidth, code sequence, or combinations thereof. These resources are generally shared among users of the communication system. In such an ad-hoc network, there may either be a dedicated master access point for managing the ad-hoc network, or alternatively one radio access point may adopt the master access point functionalities for management of the ad-hoc network.

It should be apparent to those skilled in the art that a cellular base station and an ad-hoc master access point share at least part of the responsibilities for managing the resources and users within their area of coverage. Similarly the role of a radio access point in an ad-hoc network has a lot in common to the role of a mobile device in a cellular wireless system. For matters of simplicity the following description shall be referring to a cellular wireless network. Changes required for application of the present invention to ad-hoc networks are easily derived for those skilled in the art from the description.

In the context of wireless communication, all operations involved in either transmitting or receiving data are referred to as processing data. In order to process data, the mobile device has to expend operating and processing power for its equipment. From an economical point of view, the most reasonable expenditure of this power is obtained if in return the mobile receiver processes a lot of data while the power is spent. On the other hand, such power is rather wasted if while expending the power no or little data is processed.

The allocation of data to a user via the channel resource is usually done by a scheduling algorithm. At least for downlink, i.e. for the transmission direction from base station to mobile terminal, such a scheduler is usually operating in the base station or other parts of the non-mobile entities within the communication system. Such a scheduler usually evaluates parameters such as service data rate, channel state, but does not take into account an economic factor as described above. Even for uplink, i.e. for the transmission direction from mobile terminal to base station, a scheduler may operate in a central node (e.g. base station in cellular systems, master station in an ad-hoc network) to allocate resources. The result of such central node scheduling may then be transmitted to the mobile entities.

In wireless communication systems employing Dynamic Channel Assignment (DCA) schemes air-interface resources are assigned dynamically to links between a base station (BS) and multiple mobile terminals (MT). A layout of a typical communication system is shown in FIG. 1, wherein a BS serves several MTs in a service area. The air-interface resources are usually defined by a logical channel, where a logical channel corresponds to e.g. one or multiple codes in a CDMA system, one or multiple subcarriers in an OFDM system, one or multiple timeslots in a TDMA system (e.g. GSM), or to combinations of those e.g. in an OCDMA or an MC-CDMA system. DCA can be applied to uplink and downlink.

Employing Adaptive Modulation and Coding (AMC), the data-rate within a scheduling frame for a scheduled MT will be adapted to the instantaneous channel quality of the respective link by changing the modulation and coding scheme dynamically. AMC is typically applied jointly with DCA.

In a system making use of DCA and AMC a so-called scheduler decides which resources are assigned to which MT. A commonly used approach is to use centralized scheduling, where the scheduler is located in the BS and performs its decision based on the following side information, such as channel quality information of the links to the MTs or offered traffic for specific links e.g. amount of data available for transmission to a specific MT.

Common objectives of the scheduler are to achieve fairness between users, maximize system throughput and/or fulfill Quality of Service (QoS) requirements (e.g. delay, data-rate, loss rate, jitter) for the services run by the scheduled mobile terminals. In state-of-the-art wireless communication systems the scheduler works on a packet basis.

The following schedulers are well known examples in the area of wireless communications:

Round Robin (RR) Scheduler:
This scheduler allocates equal air-interface resources to all MS independent of the channel conditions thus achieving fair sharing of resources.

Max-Rate (MR) or Max C/I (MC) Scheduler:
This scheduler chooses the user with the highest possible instantaneous data-rate (carrier-to-interference C/I ratio). It achieves the maximum system throughout but ignores the fairness between users.

Proportional Fair (PF) Scheduler:
This scheduler maintains an average data-rate transmitted to each user within a defined time window and examines the ratio of the instantaneous to the average channel conditions (or ratio of the instantaneous possible data-rate to the average data-rate) experienced by different users and chooses the user with the maximum ratio. This scheduler increases the system throughput with respect to RR scheduling, while maintaining some degree of long-term fairness.

More detailed information on the structure and function of a scheduler can be obtained for example from US 2003/0104817 which discloses a method for scheduling multiple users sharing a communication resource, particularly relating to high data rate wireless transmission putting emphasis on QoS considerations.

In current systems, a terminal may transmit signals to tell the scheduler what data rate is necessary to satisfy the user or service. Among other parameters, this may involve an average connection (or service) data rate and a maximum allowable delay. However, the scheduling at BS cannot know whether an MT is working efficiently in terms of power consumption for reception of data.

SUMMARY OF THE INVENTION

The object of the present invention is to provide a method of performing a scheduling algorithm which allows a receiver to operate economically with reasonable expenditure of operating and processing power.

A further object is to provide a method for generating a minimum resource parameter used in a scheduling algorithm which allows efficient scheduling of frames.

The above objects are solved by methods as set forth below.

The invention is based on the idea of providing signaling of a minimum resource parameter from a communication unit which can be for example either a mobile terminal or a base station to provide a scheduler with information about power expenditure for processing of data. The signaling carries information about a minimum amount of channel resource which should be allocated by a scheduler in a scheduling frame for radio access to the communication unit. Radio access is understood as the access of a first communication unit to at least part of the radio resource (e.g. logical channel, physical channel, frequency band, time slot, code, etc.) in order to transmit or receive data from or to a second communication unit or a node (e.g. base station, mobile terminal, radio access point) within a wireless communication network, for instance, a cellular system, a sector thereof or an ad-hoc network. Consequently such signaling may carry information about downlink radio access, as well as about uplink radio access, either in distinct signal instances or at the same time.

According to preferred embodiments, the minimum resource parameter might represent either a minimum number of allocation units or a minimum number of information bits for a user or a service in a scheduling frame. According to a variant, the minimum resource parameter represents a minimum ratio of processed information bits to the expended processing and operating power spent for its activity during radio access.

According to a further preferred embodiment, the minimum resource parameter is periodically signaled from the communication unit. Alternatively, it may be requested by the scheduler or initiated by the communication unit upon fulfillment of power management conditions, for instance, battery power status or power link budget for communication.

Advantageously, additional scheduling parameters such as channel conditions, amount of data available for transmission, quality of service, delay, data rate and carrier to interference ratio is considered in the scheduling algorithm.

According to a further preferred embodiment, the determination of power expended includes considering power units for each bit processed (variable cost) and/or the power units expended for processing of a scheduling frame (fixed cost). In this manner, a very precise determination of the power expended may be obtained.

BRIEF DESCRIPTION OF THE DRAWINGS

The invention will be described with reference to the following preferred embodiments with reference to the accompanying figures.

DETAILED DESCRIPTION OF THE INVENTION

Figure 1:
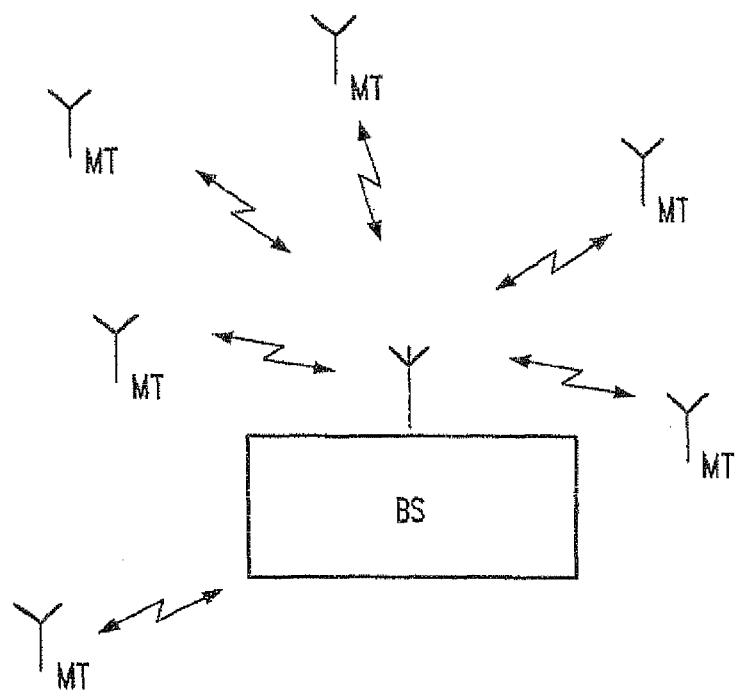
FIG. 1 illustrates the cellular concept consisting of one base station and six mobile terminals.
Figure 2:
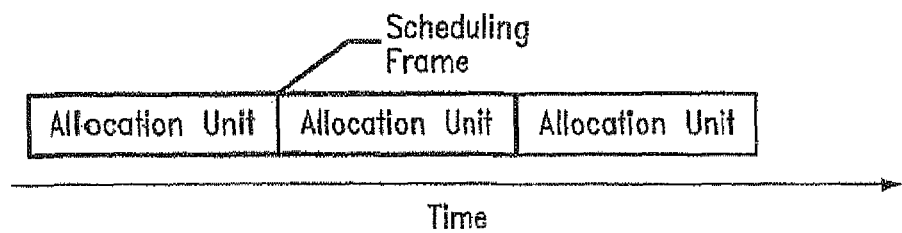
FIG. 2 shows an example of a time-division frame structure, where two allocation units form one scheduling frame.
Figure 3:
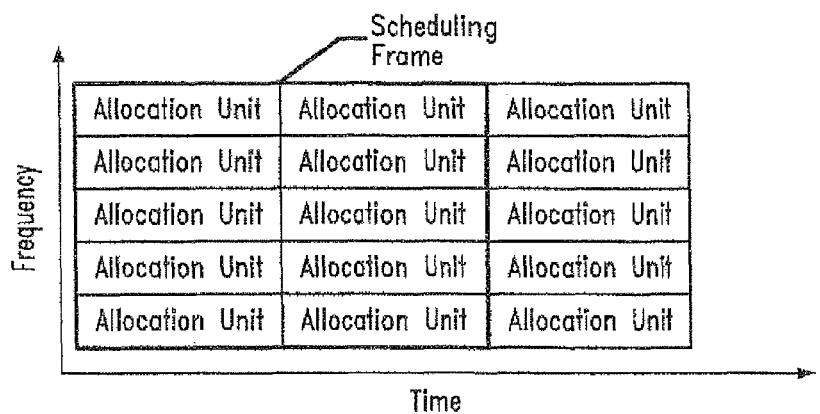
FIG. 3 shows an example of a time/frequency-division frame structure, where ten allocation units form one scheduling frame.
Figure 4:
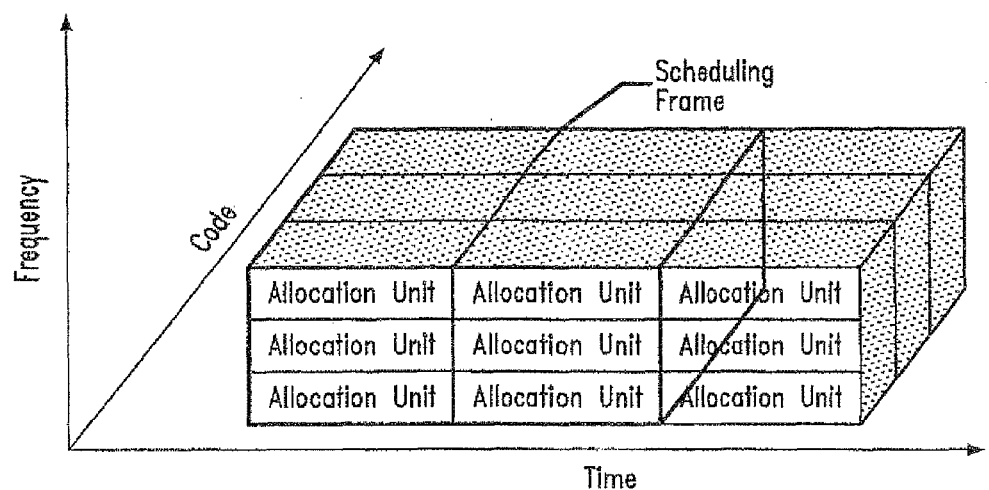
FIG. 4 shows an example of a time/frequency/code-division frame structure, where eighteen allocation units form one scheduling frame.

FIGS. 2 to 4 illustrate the concept of scheduling a frame based on an arbitrary number of allocation units either in the time domain (FIG. 2) the time-frequency domain (FIG. 3) or the time-frequency-code domain (FIG. 4).

As mentioned above, the scheduling is performed in a scheduler usually comprised in the base station or other parts of the non-mobile entities of the communication system.

Usually, the scheduling is applied to allocation units (e.g. in the time/frequency/code domain) having a quantity of transferable information bits. However, for implementation purposes other quantities may be easier to obtain, calculate or estimate, or may be more representative than bit figures. Such quantities include, but are not limited to a number of modulation symbols, FEC code blocks or Internet protocol packets.

Generally, it is preferred to schedule a large number of adjacent allocation units to a single user. Typically, a complete frequency band is allocated to a user in order to reduce the amount of signaling which needs to be sent from the base station to the mobile terminal.

Figure 5:
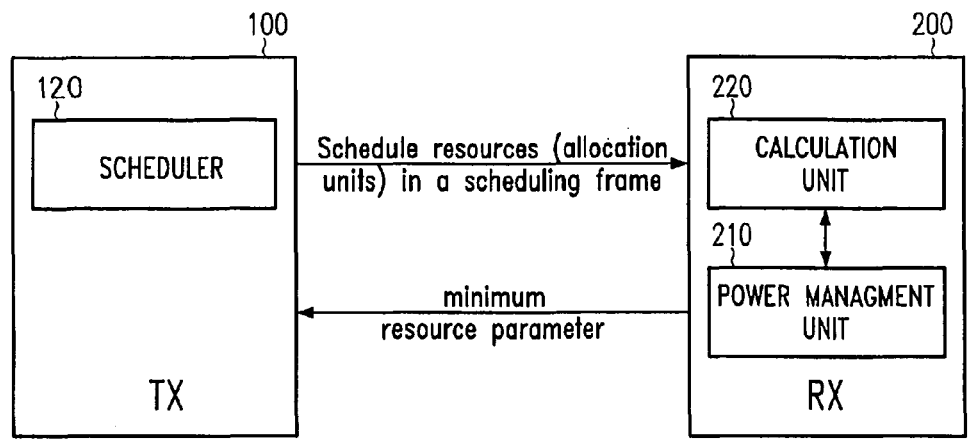
FIG. 5 illustrates structural details of a receiver and a transmitter adapted to carry out the method according to the invention.

In FIG. 5 a transmitter is generally denoted with reference numeral 100 and the receiver is denoted with numeral 200. As apparent from the figure, only the necessary details for illustrating the invention are shown. The remaining functional units of the transmitter and receiver are known to those skilled in the art and have been omitted in order to keep the description concise.

The transmitter includes a scheduler 120 which schedules resources (allocation units) in a scheduling frame. As mentioned above, scheduling parameters, either received from the network or the mobile receiver, define a scheduling algorithm to establish communication to serve users by transmitting data packets.

The receiver 200 includes a power management unit 210 and a calculation unit 220 to calculate a minimum resource parameter as will be described further below in detail.

Based on the minimum resource parameter, the scheduler decides whether the presently available resources allow fulfilling the minimum resource parameter and if so, it schedules allocation units in a scheduling frame for that particular user. If the scheduler, due to a shortage of resources, is not able to fulfill the requested minimum resource parameter, no allocation units are scheduled at all for that particular user. This has the advantage that the resources can be shared among the remaining users. Further, it is ensured that the receiver works economically and reasonable, i.e. expenditure of power for reception of data having less than a minimum amount of information data is avoided.

Further strategies on release of allocation units in a scheduling frame in case of not meeting a minimum resource constraint are described in co-pending international patent application entitled "A Method and Scheduler for Performing a Scheduling Algorithm with Minimum Resource Scheduling" filed on Mar. 31, 2004 in the name of the present applicant.

Figure 6:
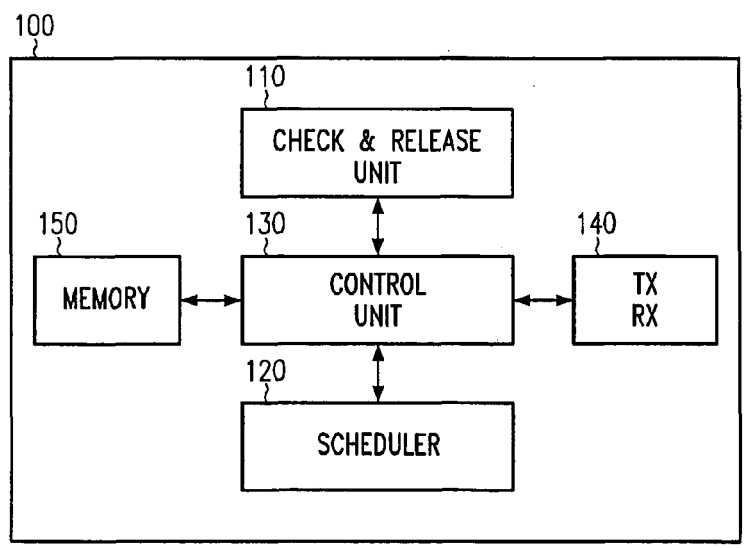
FIG. 6 reveals more details of the transmitter shown in FIG. 5.

FIG. 6 shows exemplarily some structural details in block diagram form of a transmitter (e.g. either the base station or mobile station) for carrying out the scheduling algorithm according to the invention.

Figure 7:
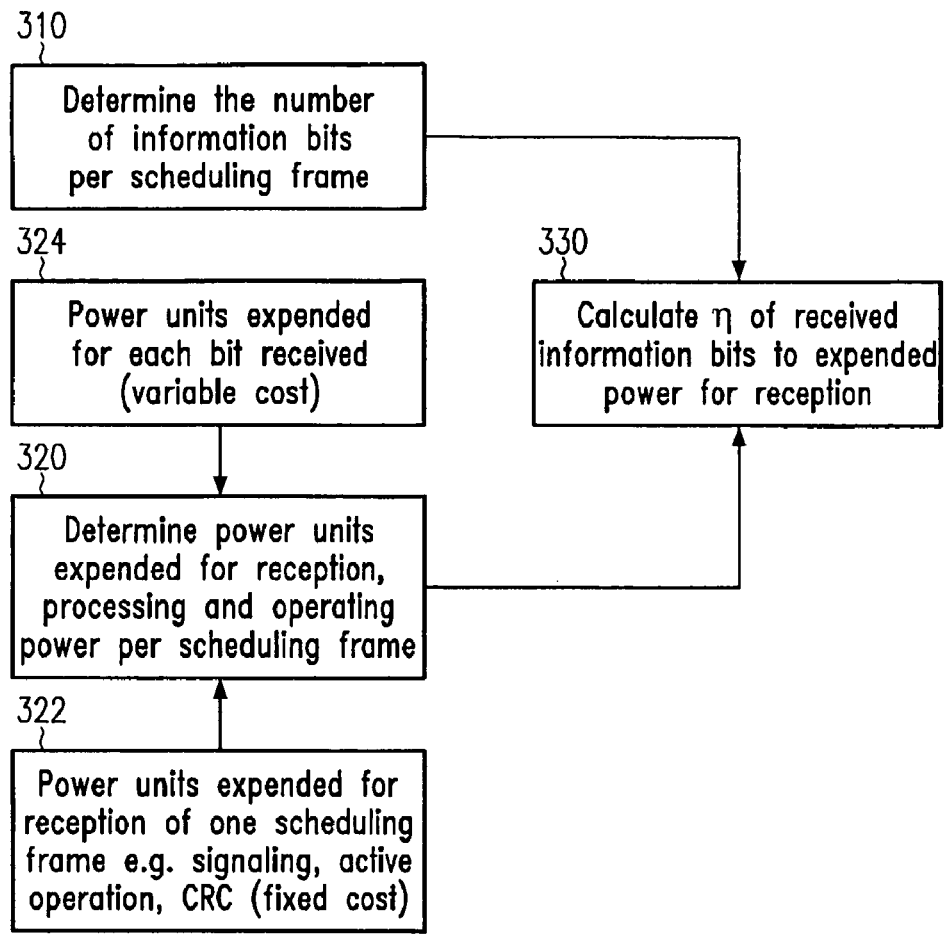
FIG. 7 illustrates a flow chart for calculating a minimum resource parameter according to an embodiment of the invention.
Figure 8:
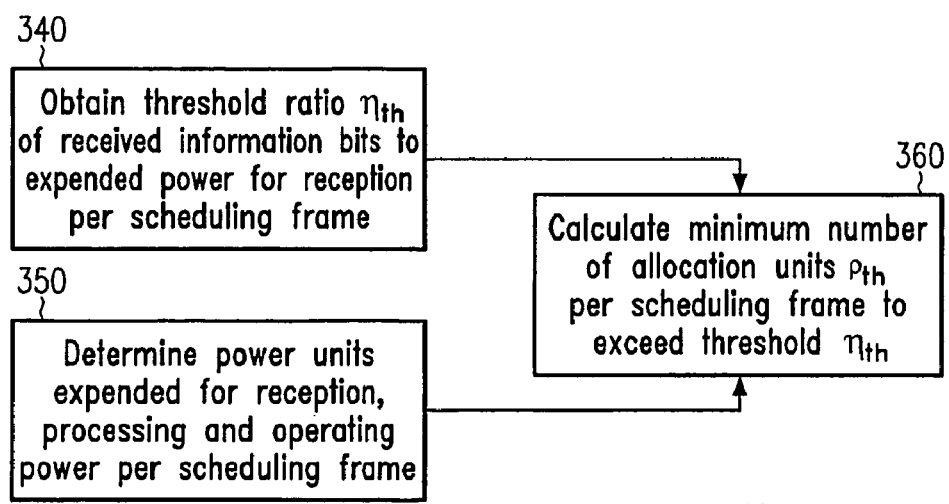
FIG. 8 illustrates a flow chart to calculate a minimum resource parameter according to another preferred embodiment.

As apparent from the figure, the transmitter 100 includes the scheduler 120, a control unit 130 and a check and release unit 110. All other conventional structural details of the transmitter have been omitted as far as they have no direct impact of the invention. The scheduler 120 together with the control unit 130 implements the scheduling algorithm. The check and release unit 4 receives the minimum resource parameter which is generated in the receiver 200 (FIG. 5) in a manner as illustrated in FIGS. 7 and 8. The minimum resource parameter is preferably stored in a buffer memory 150 which is accessed by the control unit 130 and may be updated upon system initialization or upon receiving a corresponding command from the receiver or the network controller of the system.

Finally, the transmitter 100 (as well as the receiver 200) comprises transmission and receiving circuitry 140 for sending and receiving data and control signals using its antenna over the air interface. As mentioned before, signaling data concerning the minimum resource parameter are transmitted to or received from other communication units of the system. Again, the details of the transmission and receiving operation using logical data channels and control channels are known for the person skilled in the art in the field of communications.

Although the above description has been focused on having the scheduler implemented in the base station acting as transmitter, the principles of the present invention may be readily applied by those skilled in the art to a mobile terminal acting as transmitter for sending data to a base station as the receiving unit, i.e. uplink. In this case, the scheduler may be implemented in the mobile station to perform the scheduling algorithm as described above.

FIG. 7 shows the essential steps for the calculation of a minimum resource parameter according to an embodiment of the invention where the minimum resource parameter is applicable to reception of data. The minimum resource parameter is consequently represented by a ratio of received information bits in relation to the power expended for the reception thereof per scheduling frame.

In order to calculate this ratio, first the number of information bits per scheduling frame is determined in step 310. Moreover, the power units expended for reception of the information bits including the processing and operating power per scheduling frame are determined in step 320. The power units may be coarsely divided between those which are expended for reception of one scheduling frame including overhead signaling, active operation of the receiver circuitry, CRC check sum, etc, designated with reference numeral 322. These power units are generally denominated as fixed cost, because they show no direct relation to the amount of information received per scheduling frame.

Additionally, power units expended for each bit received representing a variable cost factor are also taken into consideration, designated with reference numeral 324.

Based on the results of determination steps 310 and 320, the ratio of received information bits to the expended processing and operating power may be defined as follows:

$$\eta = \frac{\text{received information bits per scheduling frame}}{\text{expended power for reception per scheduling frame}} \quad (1)$$

Obviously, the higher $\eta$ is, the better a mobile terminal is able to operate from an economical point of view. In order to determine whether a receiver is working economically reasonably, the resources allocated to that receiver should exceed a minimum resource threshold $\rho_{th}$ that is equivalent to a certain $\eta_{th}$ threshold value. Since different mobile terminals will use different architectures, there will be a wide variety of terminal capabilities which cannot be foreseen when planning a communication system. Therefore there is a need to signal such threshold values to the network using the air interface.

Usually, the variable power units expended depend mainly on the number of bits processed. However there may be cases where the variable costs depend on other quantities. Such quantities include, but are not limited to a number of processed allocation units, modulation symbols, FEC code blocks or Internet protocol packets.

FIG. 8 describes another embodiment for calculating the minimum number of allocation units for a scheduling frame to exceed a threshold ratio. In order to calculate the minimum number of allocated resources $\rho_{th}$, first the threshold of $n_{th}$ of received information bits to expended power for reception per scheduling frame is obtained as given by the network (step 340). Further, in step 350 the power units expended for reception, processing and operating power per scheduling frame need to be determined. Based on the results of step 340 and 350 the minimum number of $\rho_{th}$ of allocation units required to exceed threshold $n_{th}$ is calculated in step 360 according to below given equation (2).

The exact relation between allocated resources and received information bits will depend on the communication system. Almost always there will be additional signaling of some sort in addition to the transmission of pure information data. Consequently the power unit cost can be divided into fixed costs and variable costs.

Example

For this example the following assumptions apply:
1. One allocation unit (au) is capable of transmitting 1000 information bits.
2. A CRC checksum is appended for the information data of one scheduling frame, the size is 24 bits (=fixed cost).
3. For associated signaling, an extra overhead of 48 bits needs to be transmitted in each scheduling frame (=fixed cost).
4. For each bit received, the receiver has to expend 1 power unit (pu) (applicable both to fixed and variable cost).
5. For overall active operation, the receiver has to expend 2000 pu per scheduling frame (=fixed cost).

Case 1

Allocated resources per scheduling frame $\rho_{alloc}$ are sufficient to transmit one allocation unit to a user, $\rho_{alloc}=1$ au/frame.

Consequently, $$\eta = \frac{1 \frac{au}{frame} \cdot 1000 \frac{bit}{au}}{\left(1 \frac{au}{bit} \cdot 1000 \frac{bit}{au} + 24 \frac{bit}{frame} + 48 \frac{bit}{frame}\right) \cdot 1 \frac{pu}{bit} + 2000 \frac{pu}{frame}}$$

$$\approx 0.32552 \frac{bit}{pu}.$$

Case 2

Allocated resources are sufficient to transmit sixteen allocation units to a user, $\rho_{alloc}=16$ au/frame.

Consequently, $$\eta = \frac{16 \frac{au}{frame} \cdot 1000 \frac{bit}{au}}{\left(16 \frac{au}{bit} \cdot 1000 \frac{bit}{au} + 24 \frac{bit}{frame} + 48 \frac{bit}{frame}\right) \cdot 1 \frac{pu}{bit} + 2000 \frac{pu}{frame}}$$

$$\approx 0.88535 \frac{bit}{pu}.$$

Case 3

If a threshold of $\eta_{th}=0.5$ bit/pu is given (e.g. by the communication system), the minimum number of allocation units required to exceed that threshold is obtained as:

$$\rho_{th} = \frac{\eta_{th}}{1 - \eta_{th} \cdot \text{variable pu cost per bit}}. \quad (2)$$

$$\underline{\text{fixed pu cost per scheduling frame}}$$
$$\text{number of information bits per au}$$

$$\rho_{th} = \frac{0.5 \frac{bit}{pu}}{1 - 0.5 \frac{bit}{pu} \cdot 1 \frac{pu}{bit}}$$

$$\frac{\left(24 \frac{bit}{frame} + 48 \frac{bit}{frame}\right) \cdot 1 \frac{pu}{bit} + 2000 \frac{pu}{frame}}{1000 \frac{pu}{au}}$$

$$= 2.072 \frac{au}{frame}$$

Therefore the minimum number of resources allocated in a scheduling frame $\rho_{alloc} \geq \rho_{th}$ should be three or more.

It is noted that a threshold value $\eta_{th}$ may be given by the communication system design, i.e. is signaled from BS (or network) to the mobile terminal, or is determined autonomously by the mobile terminal e.g. depending on the battery status.

It is further noted that the extension of the presented method to transmission of data (e.g. in uplink) is apparent to those skilled in the art, regardless of whether a scheduler resides in a base station or a mobile terminal.

The signaling by the mobile terminal may be transmitted periodically (e.g. each frame, one per specified time interval, etc.) or upon a special request by the network or base station. A further mechanism could be implemented that upon initiation by the mobile terminal, e.g. if the battery capacity falls below a certain level the signaling of a minimum resource parameter is effected. In this manner, an economy class value may be defined representing a range of resources or a number of bits (e.g. class I may represent one to two allocation units, class II may represent three to five allocation units; class A may represent 1,000 to 1,500 bits, class B may represent 1,501 to 3,800 bits; etc.).

A further possible condition where signaling might become necessary is during setup or establishment of a connection or call between the base station and mobile terminal.

Finally, the above exemplarily calculated or obtained threshold values may be influenced by the actual battery power status of the mobile terminal, the possible power connection to a fixed power line network, the duration of a connection, or the power link budget for communication between the base station and mobile terminal.

The invention claimed is:

1. A method for performing a scheduling algorithm in a scheduler of a wireless communication system, comprising:
   obtaining from a communication unit a minimum resource parameter that indicates a minimum number of allocation units to be scheduled for a user or service in a scheduling frame in order to meet a resource constraint of the communication unit, and
   scheduling, in the scheduling frame, resources for radio access to the communication unit wherein the resources are scheduled in the allocation units and in accordance with the minimum resource parameter,
   wherein the allocation units are scheduled to the communication unit only if the minimum number of allocation units indicated by the minimum resource parameter can be scheduled for the service or user within the scheduling frame,
   wherein the minimum resource parameter represents a sufficient quantity to exceed a power efficiency threshold in the scheduling frame, and
   wherein the minimum resource parameter represents a minimum ratio of a number of information bits processed by the communication unit in a scheduling frame to an expended processing and operating power spent during the radio access by the communication unit in said scheduling frame.

2. The method according to claim 1, wherein the minimum resource parameter represents a minimum number of information bits per scheduling frame for the user or the service.

3. The method according to claim 1, wherein the minimum resource parameter is signaled periodically from the communication unit to the scheduler.

4. The method according to claim 1, wherein the minimum resource parameter is signaled from the communication unit to the scheduler upon request by the scheduler.

5. The method according to claim 1, wherein the obtaining of the minimum resource parameter is initiated by the communication unit upon fulfillment of power management conditions.

6. The method according to claim 1, wherein the scheduling includes considering in addition at least one of the scheduling parameters of channel condition, amount of data available for transmission, Quality of Service (QoS), delay, data rate and carrier to interference ratio.

7. The method according to claim 1, wherein the scheduling frame has at least one of a time division, frequency division or code division frame structure.

8. The method according to claim 1, wherein the allocation units have a quantity of either one of transmittable information bits, Internet Protocol (IP) packets, code blocks or modulation symbols.

9. The method according to claim 1, wherein the minimum resource parameter is signaled by the communication unit on a separate control channel associated to a data channel over which the allocation units are transmitted.

10. A base station for use in a wireless communication network, comprising:
    a processing section configured to obtain, from a mobile terminal, a minimum resource parameter that indicates a minimum number of allocation units to be scheduled for a service or user in a scheduling frame in order to meet a resource constraint of the mobile terminal, and
    a scheduler configured to schedule, in the scheduling frame, resources to the mobile terminal in a form of allocation units and in accordance with the minimum resource parameter, wherein the scheduler schedules the allocation units to the mobile terminal only if the minimum number of allocation units indicated by the minimum resource parameter can be scheduled for the service or user of the mobile terminal within the scheduling frame, wherein the minimum resource parameter represents a sufficient quantity to exceed a power efficiency threshold in the scheduling frame, and wherein the minimum resource parameter represents a minimum ratio of a number of information bits processed by the communication unit in a scheduling frame to an expended processing and operating power spent during the radio access by the communication unit in said scheduling frame.

\* \* \* \* \*